US010149354B2

United States Patent
Knoedgen et al.

(10) Patent No.: US 10,149,354 B2
(45) Date of Patent: Dec. 4, 2018

(54) POWER CONVERTER CONTROLLER

(71) Applicant: Dialog Semiconductor (UK) Limited, London (GB)

(72) Inventors: Horst Knoedgen, Munich (DE); Julian Tyrrell, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/285,688

(22) Filed: Oct. 5, 2016

(65) Prior Publication Data

US 2017/0156184 A1     Jun. 1, 2017

(30) Foreign Application Priority Data

Dec. 1, 2015 (DE) .................. 10 2015 223 920

(51) Int. Cl.
| | |
|---|---|
| H02M 3/156 | (2006.01) |
| H05B 33/08 | (2006.01) |
| H02M 7/217 | (2006.01) |
| H02M 1/36 | (2007.01) |
| H02M 3/335 | (2006.01) |
| H02M 7/02 | (2006.01) |

(52) U.S. Cl.
CPC .......... *H05B 33/0815* (2013.01); *H02M 1/36* (2013.01); *H02M 3/335* (2013.01); *H02M 7/217* (2013.01); *H05B 33/0845* (2013.01)

(58) Field of Classification Search
CPC . H02M 2001/0003; H02M 2001/0006; H02M 3/156; H02M 3/157; H02M 7/02; H02M 7/12; H02M 7/155; H02M 7/1555; H02M 7/21; H02M 7/217
See application file for complete search history.

(56) References Cited

U.S. PATENT DOCUMENTS

| 7,684,220 B2 | 3/2010 | Fang et al. | |
|---|---|---|---|
| 9,438,108 B2 * | 9/2016 | Chen | H02M 3/156 |
| 2013/0170253 A1 * | 7/2013 | Ushijima | H02M 3/33507 363/21.04 |
| 2015/0237693 A1 | 8/2015 | Knoedgen et al. | |

OTHER PUBLICATIONS

German Office Action, File No. 10 2015 223 920.9, Applicant: Dialog Semiconductor (UK) Limited, dated Jul. 29, 2016, 6 pgs and English language translation, 8 pgs.

* cited by examiner

*Primary Examiner* — Gary L Laxton
(74) *Attorney, Agent, or Firm* — Saile Ackerman LLC; Stephen B. Ackerman

(57) ABSTRACT

A controller for a power converter to convert electrical power at an input voltage into electrical power at an output voltage and a method of operating such controller is presented. The controller for controlling a power converter has an input port to receive a voltage representative of the input voltage; an input voltage measuring unit to sample a measuring voltage and to determine a measurement value that is representative of the input voltage; a switch; and a diode connectable with a storage unit to provide a supply voltage for the controller during operation of the controller. The switch controls the charging of the storage unit from the voltage at the input port.

17 Claims, 4 Drawing Sheets

POWER CONVERTER CONTROLLER

TECHNICAL FIELD

The present document relates to a mains measurement and supply charging schema for power converters, in particular for LED drivers.

BACKGROUND

The supply voltage for a mains powered LED driver is typically generated from an external supply, or from a tertiary winding on a fly-back switching coil. When the device is first turned on, the usual approach is to initially charge the VCC supply from an input voltage sense resistor—through an internal diode—and then switch on an internal resistor to form a potential divider to allow the mains voltage measurement. Alternative techniques use an external Zener diode and bleed resistor as well as the supply from the tertiary winding. The power supply for the driver IC takes a significant number of external components however it is done.

SUMMARY

There is a need to provide a more efficient power supply for a power converter such as a LED driver, in particular for a controller IC that controls operation of the power converter e.g. by driving one or more switches of a switched mode power converter. It would be useful if the power supply would reuse existing means for measuring the input voltage of the power converter, e.g. an already rectified AC (alternating current) input such as provided by the mains supply, thereby reducing the number of pins of the controller IC. Preferably, the number of external components is reduced to allow for cost efficient solutions. In view of this need, the present document proposes a controller for controlling a power converter and a method of powering a controller for a power converter, having the features of the respective independent claims.

According to an aspect of the disclosure, a controller for controlling a power converter to convert electrical power at an input voltage into electrical power at an output voltage is provided. The controller comprises an input port configured to receive a voltage representative of the input voltage, e.g. derived from the input voltage so that the input voltage can be determined from the received voltage. The controller further comprises an input voltage measuring unit configured to sample a measuring voltage at a measuring time and determine a measurement value that is representative of the input voltage. In other words, the input voltage measuring unit may determine the input voltage from the sampled measuring voltage which may be the voltage received at the input port or a voltage derived therefrom. The controller further comprises a diode connectable with a storage unit to provide a supply voltage for the controller during operation of the controller. The storage unit may be a charge storage unit such as a capacitor, in particular an external capacitor that is connected via a VCC port to the controller. As such, the capacitor, when appropriately charged, provides the supply voltage VCC for operating the controller.

Furthermore, a switch is provided that can be controlled to open or close, i.e. to be in a non-conducting or a conducting state. The switch may be connected between the input port and the input voltage measuring unit and coupling, when closed, the input voltage measuring unit with the input port so that the voltage at the input port can be sampled and measured. However, in embodiments, other configurations may be possible as explained below. The input voltage measuring unit may be an analog-to-digital converter (ADC) that is triggered to sample and measure the measuring voltage at the measuring time based on a received control signal. The switch may be controlled based on another control signal to control charging of the storage unit from the voltage at the input port, thereby ensuring that the necessary supply voltage for operating the controller is provided by the storage unit. For example, when the switch is open, the storage capacitor is charged via the diode and when the switch is closed, the capacitor in not charged. The storage capacitor may provide the supply voltage irrespective of the switch state, i.e. when the switch is open and closed.

The above circuit configuration allows charging of the storage unit and measuring the input voltage via a single pin of the controller. Further, there is no need for further means to charge the storage unit e.g. from the output voltage of the controller such as from a tertiary winding on a fly-back switching coil. In other words, the storage unit is only charged via the input port and the diode of the controller. Hence, the number of external components is reduced.

The switch may be operated and the storage unit charged as suggested above during system startup to power the controller IC as long as the power converter is not yet operating properly (and no output voltage is generated). The suggested charging of the storage unit via the switch and diode to draw current from the input port and supply it to the storage unit may continue also after startup, e.g. during the full operating time of the controller or power converter.

The controller may further comprise a (internal) resistor which forms a voltage divider with an external resistor connected to the input port. The input voltage measuring unit may then be connected with a first terminal of the resistor to measure a portion of the input voltage as determined by the voltage divider. The second terminal of the resistor may be connected with ground. For example, the portion of the input voltage that applies at the first terminal of the resistor may be determined by the voltage divider ratio.

In many cases, the power converter comprises a rectifier connectable with an alternating current (AC) mains supply and the input voltage is the rectified mains voltage provided by the rectifier. The input voltage measuring unit may then determine a measurement value that is representative of the input voltage, i.e. the rectified mains voltage. The determining may be periodically and the measurement value may be an instantaneous voltage of the rectified mains voltage, which can be used to determine a present phase angle of the mains voltage, e.g. for sensing zero crossing of the mains voltage or application of a phase cut dimmer.

In order to control the supply voltage provided by the storage unit to the controller, the switch may be controlled based on the charge stored in the storage unit e.g. based on the voltage of the capacitor. For example, the switch may be closed when the supply voltage provided by the capacitor reaches a predetermined voltage threshold, which may be higher than the nominal supply voltage VCC. In the next time period, the capacitor provides power supply to the controller whereas the supplied current discharges the capacitor so that the capacitor voltage drops. When the capacitor voltage drops below a second voltage threshold, the switch may be opened again to recharge the capacitor and the charging cycle repeats.

In embodiments, the input voltage measuring unit periodically samples the measuring voltage to periodically determine a measurement value for the input voltage. The sampling frequency may be higher than the mains frequency, preferably several times N the mains frequency. Thus, the instantaneous voltage of the input voltage (mains voltage) can be measured N-times during a mains cycle or mains halve cycle and information on a present state of the input voltage e.g. its phase position can be determined. This allows e.g. synchronization of operation of the power converter with the mains cycle.

In embodiments, the switch may be closed during the sampling time of the input voltage measuring unit. This may be useful for connecting the input voltage measuring unit with the input port for measuring the (divided) input voltage, in particular when the input port is connected with the diode and a first terminal of the switch. This allows that the input voltage measuring unit samples the measuring voltage at a second terminal of the switch.

In embodiments, the controller may further comprise a current mirror connected with the input port, receiving a current from the input port and splitting the current according to the current mirror ratio. In this case, the diode and the switch may be connected to a node in a first branch of the current mirror, and the input voltage measuring unit may be connected to a node in a second branch of the current mirror. The first branch thus carries a portion of the current received from the input port that can be used to charge the storage unit (via the diode), while the second branch carries a portion of the current that can be used for measuring the input voltage. As such, the current mirror may be configured so that the second branch carries only a smaller portion of the received current, but which is sufficient for the measurement purpose.

As already mentioned, the charging of the storage unit may be controlled by operating the switch, which in this embodiment is located in the first branch of the current mirror. For example, when the switch is open, the storage unit is charged and when the switch is closed, the charging is interrupted, e.g. when the voltage at the storage unit reaches a predetermined voltage threshold. The first branch of the current mirror may further comprise a diode connected transistor, a Zener diode or a resistor, connected e.g. between the second switch terminal and ground. These elements may limit the current through the switch when closed and cause a voltage at the node in the first branch that is lower than the supply voltage VCC, thereby bringing the charge current into the storage unit to a halt.

In embodiments, the power converter is a switched mode power converter comprising at least one power switch and the controller provides drive signals for the at least one power switch so as to regulate the output voltage. For example, the converter may be a buck converter or a flyback converter such as employed in a LED driver where mains power is converted and controlled to drive a string of solid state lighting elements to emit light.

According to another aspect a method for powering a controller for a power converter that is converting electrical power at an input voltage into electrical power at an output voltage is disclosed. The method comprises receiving a voltage representative of the input voltage an input port; sampling a measuring voltage and determining a measurement value that is representative of the input voltage; and controlling a switch to effect charging of a storage unit such as a capacitor from the voltage at the input port, the capacitor to provide a supply voltage for the controller during operation of the controller and connected to a diode, which allows charging current from the input port to flow into the capacitor.

Controlling the switch may be based on the supply voltage provided by the capacitor. To that end, the switch is controlled open and closed to regulate the voltage at the capacitor so that it can be used as regulated supply voltage for the controller to provide operating power to the controller during its entire operation. The switch may be operated not only during startup to power the controller IC as long as the power converter is not yet operating properly, but the charge stored in the capacitor may be used to supply power to the controller also after startup, e.g. during the full operating time of the controller or power converter. As such, there is preferably no other means to charge the capacitor other than the controller itself, using its switch and diode to draw power from the input port and supply a charging current to the capacitor.

The measuring voltage may be periodically sampled and corresponding measuring values for the input voltage generated. In between sampling periods, the switch may be open to charge the capacitor without disturbing the measurement process.

Controlling the switch may comprise controlling the times when the switch is open or keeping the switch closed in between sampling periods based on the supply voltage provided by the capacitor. For example, if the voltage at the capacitor is still sufficiently high to be used as supply voltage for a continued period of time, e.g. during a sampling/measurement period, there is no need to charge the capacitor and a charging cycle in between successive sampling periods may be skipped, i.e. the switch may not be opened during that time period. Alternatively, the charging time may be cut short if the capacitor voltage reaches a threshold that indicates that sufficient charge is available in the capacitor to power the controller for a predetermined time period.

The method may further comprise generating drive signals for power switches for the power converter and outputting the drive signals to the power switches. Thus, the controller may drive a switched mode power converter to supply output power at the desired output voltage.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods.

BRIEF DESCRIPTION OF THE DRAWINGS

Embodiments of the disclosure are explained below in an exemplary manner with reference to the accompanying drawings, wherein FIG. 1 schematically illustrates an internal block diagram for a controller integrated circuit (IC) that controls operation of a power converter such as a LED driver. In particular, the controller IC can be utilized to drive one or more switches of a switch mode power converter.

DESCRIPTION

In the following examples of the present invention are explained in detail in correspondence with the figures. Corresponding or rather analog elements of the figures have been labeled with the same reference sign.

Figure 1:
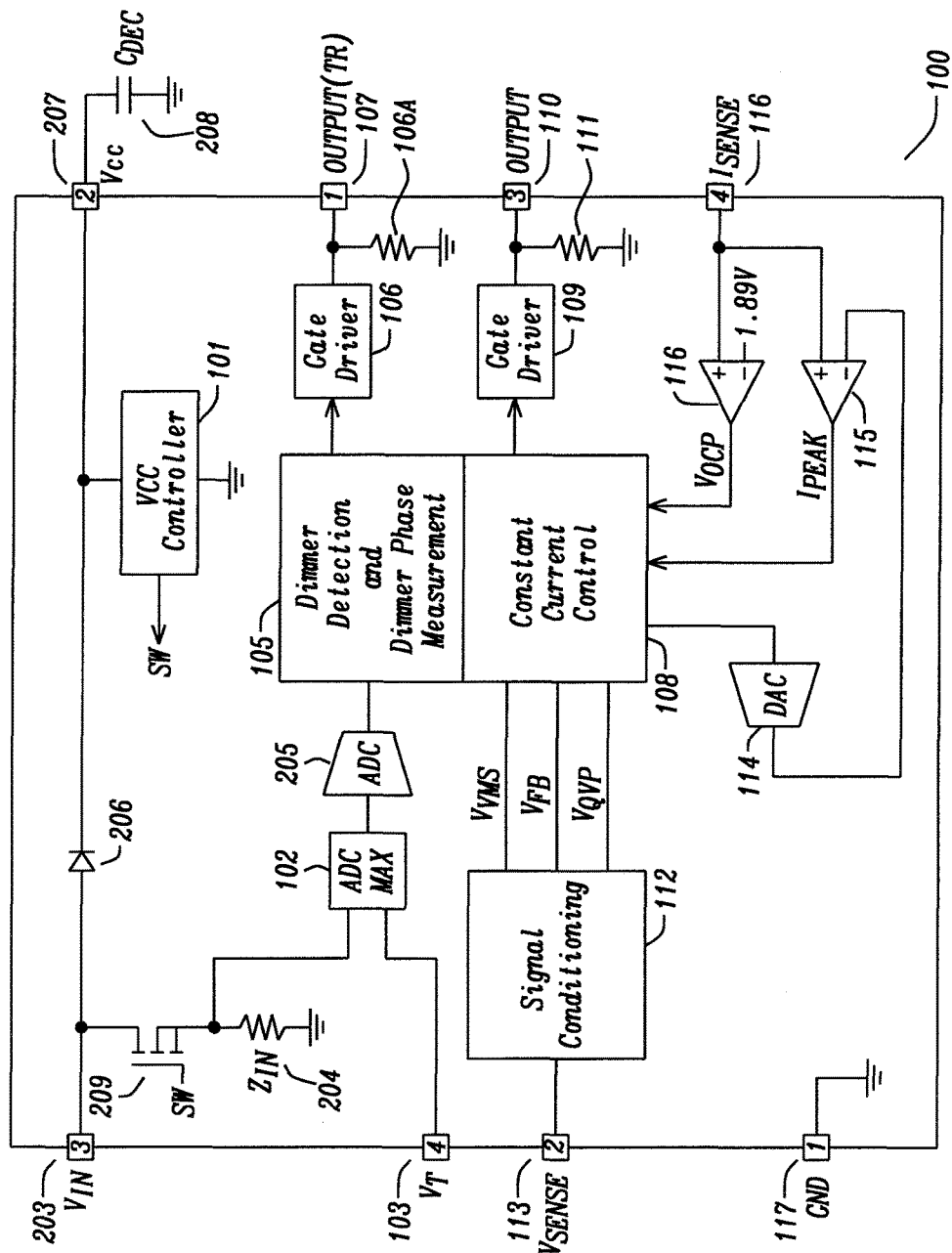

FIG. 1 depicts schematically a controller integrated circuit (IC) 100 that controls operation of a power converter such as a LED driver. The controller 100 comprises an input port VIN 203 for the supply of an input signal. Furthermore, a VIN to VCC charging path comprising a diode 206 is established between the VIN input port 203 and a VCC port 207. A capacitor for 208 for driving the controller 100 is connected to the VCC port 207. In other words, capacitor 208 provides power supply to the controller integrated circuit 100. In addition, a VCC-controller 101 is connected to the VIN to VCC charging path. The VCC controller 101 controls activation and deactivation of a switch 209, which is connected to the VIN to VCC charging path. The VCC controller 101 can control the activation state of switch 209 as well as the charging process of capacitor 208. The switch 209 is connected to the VIN to VCC charging path between the input port 203 of the controller 100 and the diode 206. The switch 209 is depicted as MOSFET transistor, however other implementations of the switch 209 are possible as will be explained below. In particular, the VCC controller 101 can measure the voltage of capacitor 208 and can determine to open or close the switch 209 in correspondence to the measured voltage, i.e. charge stored in the capacitor 208. In order to open or close switch 209, the VCC controller 101 can generate a signal SW that controls the switching state of the switch, i.e. controls the switch to be in an open or a closed configuration. In addition, IC 100 receives operation power from the VIN-VCC charging path connected with VCC port 207 (not depicted).

Furthermore, the switch 209 is connected to a resistor element 204 which is connected to ground. A first input of a multiplexer unit 102 is connected between the switch 209 and the resistor 204. A second input of multiplexer unit 102 is connected to another input port 103 of the controller 100, e.g. for receiving a temperature measurement signal $V_T$. The multiplexer unit 102 selects one of several input signals and forwards the selected input into an analog-to-digital converter (ADC) 205. The ADC 205 is utilized for mains voltage measuring upon triggering by a control signal. The ADC 205 provides input to a dimmer-detection-and-dimmer-phase-measurement-unit 105. The dimmer-detection-and-dimmer-phase-measurement-unit 105 provides input to a gate driver 106 which is connected to an output port 107 and a resistor 106 A. Adjacent to the dimmer-detection-and-dimmer-phase-measurement-unit 105 is a constant-current-control-unit 108, which provides input to a gate driver 109. The gate driver 109 is connected to output port 110 and a resistor 111. The output ports of the gate drivers are connectable to respective switches for operating the power converter. The constant-current-control-unit 108 is further connected to a signal-conditioning-unit 112. More specifically, the constant-current-controller-unit 108 receives signals from the signal-conditioning-unit 112 which are related to external input provided to signal-conditioning-unit 112 from input port 113 of the controller 100. Input port 113 receives a signal $V_{SENSE}$ that is representative of the output voltage of the power converter. Moreover, the constant-current-control-unit 108 provides input to a digital-to-analog converter 114. The output of the digital-to-analog converter 114 is provided as inverting input to a comparator 115. The comparator 115 receives noninverting input from input port 116 of the controller 100 and provides output signals back to the constant-current-control-unit 108. Input port 116 receives a signal $I_{SENSE}$ that is representative of the output current of the power converter. In addition, another comparator 116 compares an inverting reference voltage against an non-inverted input received from the input port 116 and provides output to the constant-current-control-unit 108. Another port 117 of the controller 100 is connected to ground.

Figure 2:
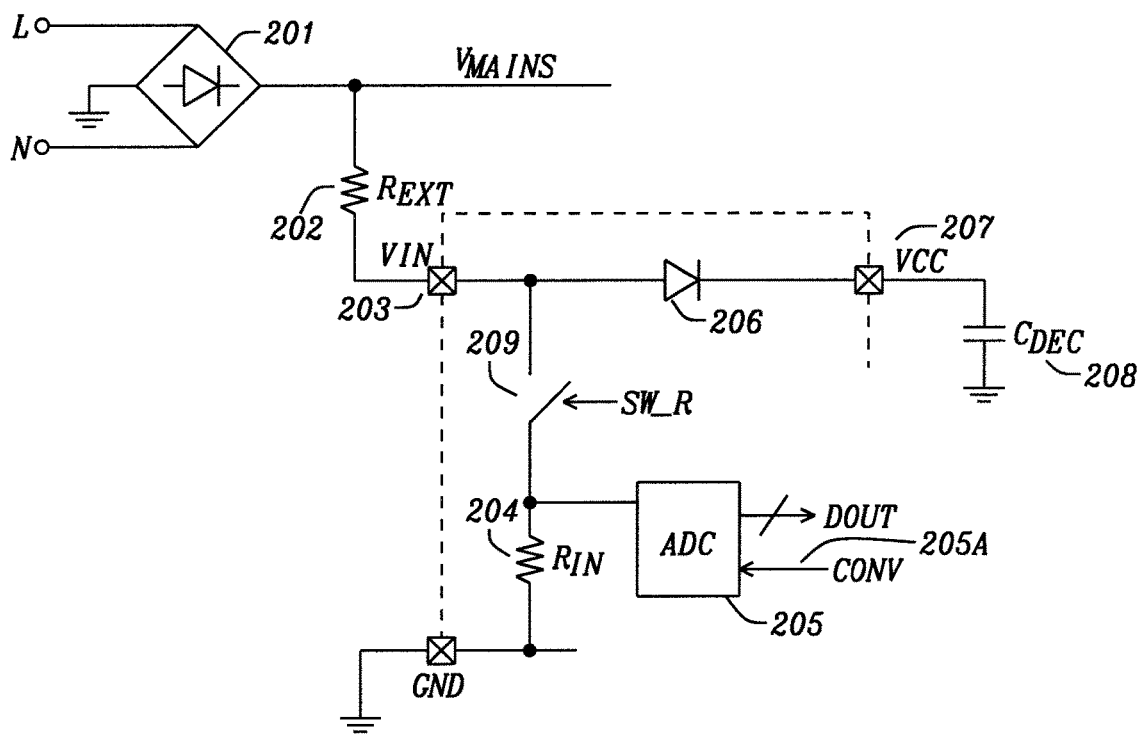
FIG. 2 schematically illustrates a section of the controller IC according to the present invention. In particular, a switch is displayed which enables charging of a capacitor. The capacitor, can be utilized to power the controller IC of a power converter. Furthermore, an ADC converter is shown that enables sampling and measuring of the measuring voltage upon triggering of a control signal.

FIG. 2 discloses a segment of a controller circuit for controlling a power converter (e.g. a LED driver). In the following the working principles of measuring a mains voltage and supplying power to the controller 100 will be explained in relation to the displayed circuit.

A full-wave rectifier 201 is displayed in FIG. 2, which converts alternating current (AC) to direct current (DC). More precisely, full-wave rectification converts both polarities of the AC input wave form to pulsating DC. Semiconductor diodes of various types (junction diodes, Schottky diodes, etc.) can be utilized for the power rectification process. Furthermore, an external resistor 202 is connected between input port 203 of the controller 100 and the full-wave rectifier 201. In combination, the arrangement of the external resistor 202 and an internal resistor 204, which is connectible to input port 203 via a switch 209 form a voltage divider. The internal resistor 204 is connected to ground. An input voltage measuring unit 205 is connected with a terminal of the internal resistor 204, which enables to measure a portion of the mains voltage provided at the rectifier output. This voltage portion is determined by the voltage divider ratio. The input voltage measuring unit 205 in FIG. 2 is realized by an analog-to-digital converter (ADC). The ADC 205 can be triggered to sample and measure voltage based upon reception of a control signal 205A.

Furthermore, a diode 206 is provided between the input port 203 and the VCC-port 207 of the controller 100. Connected to VCC-port 207 is a capacitor 208. Consequently, the diode 206 is located on a VIN-VCC charging path to capacitor 208. The diode 206 enables prevention of undesired current flow from capacitor 208. Moreover, the above mentioned switch 209 is provided between the input port 203 of the controller 100 and the input voltage measuring unit 205. The switch 209 can be realized as an electrically operated switch (relay) or a bilateral switch, i.e. an electronic component that behaves in a similar way to an electrically operated switch but has no moving parts (e.g. a MOSFET transistor as is illustrated in FIG. 1 above).

The basic working principles of the above described circuit configuration will be elaborated in the following.

If the switch 209 is controlled to be in an open configuration, current from the rectifier 201 flows through the external resistor 202 into input port 203 of the controller 100. Subsequently, the current flows through diode 206 into the capacitor for 208 and charges the capacitor 208. Therefore, the capacitor 208 can be provided with a charging current utilizing the mains voltage to drive the charging process. In other words, a voltage generated from an external supply, or from a tertiary winding of a fly-back switching coil is not necessary in order to charge capacitor 208 and subsequently supply energy to the controller 100. Consequently, the controller 100 can be supplied with power more efficiently. Furthermore, even after the start-up phase (i.e. switch-on) of the controller 100, power supply can be enabled without the need of additional external power providing circuitry.

If the switch 209 is controlled to be in a closed configuration, current from the rectifier 201 entering the controller 100 at the input port 203 flows through the closed switch 209 via internal resistor 204 to ground. As already mentioned above, external resistor 202 and internal resistor 204 form a voltage or potential divider. A voltage divider is a passive linear circuit that produces an output voltage that is a fraction of its input voltage. Resistor voltage dividers are used to create reference voltages, or to reduce the magnitude of a voltage so it can be measured. In particular, the voltage across the internal resistor 204 is utilized by the ADC 205 to determine a measurement value that is representative of the mains voltage. In the present embodiment, the ADC 205 is triggered to sample and measure voltage at measurement time instants based upon reception of a control signal 205A.

Since the mains supply is an alternating current (AC) and the input voltage is the rectified mains voltage provided by the rectifier 201, the measurement value determined by the ADC 205 is an instantaneous voltage of the rectified mains voltage. This information can consequently be utilized to determine characteristics of the mains voltage. In particular, a present phase angle of the mains voltage can be determined by the ADC 205 in order to identify zero crossings of the input signal or to utilize the determined characteristics to control secondary circuitry. Moreover, sampling the input signal at a fixed rate allows the waveform to be reconstructed accurately to allow synchronization of the LED driver switching circuitry to the mains frequency.

Moreover, in the closed configuration of switch 209, a discharge current of the capacitor 208 reduces the capacitor voltage. In particular, the switch 209 may be closed when the supply voltage provided by the capacitor 208 reaches a predetermined voltage threshold, which may be higher than the nominal supply voltage VCC. The capacitor then provides power supply to the controller 100 while simultaneously being discharged by the supply current. When the capacitor voltage drops below a second predetermined threshold, the switch may be opened again to recharge the capacitor via VIN-VCC charging path. Consequently, the number and duration of measurements performed by the ADC is performed in concert with the charging-discharging cycle of capacitor 208.

Figure 3:
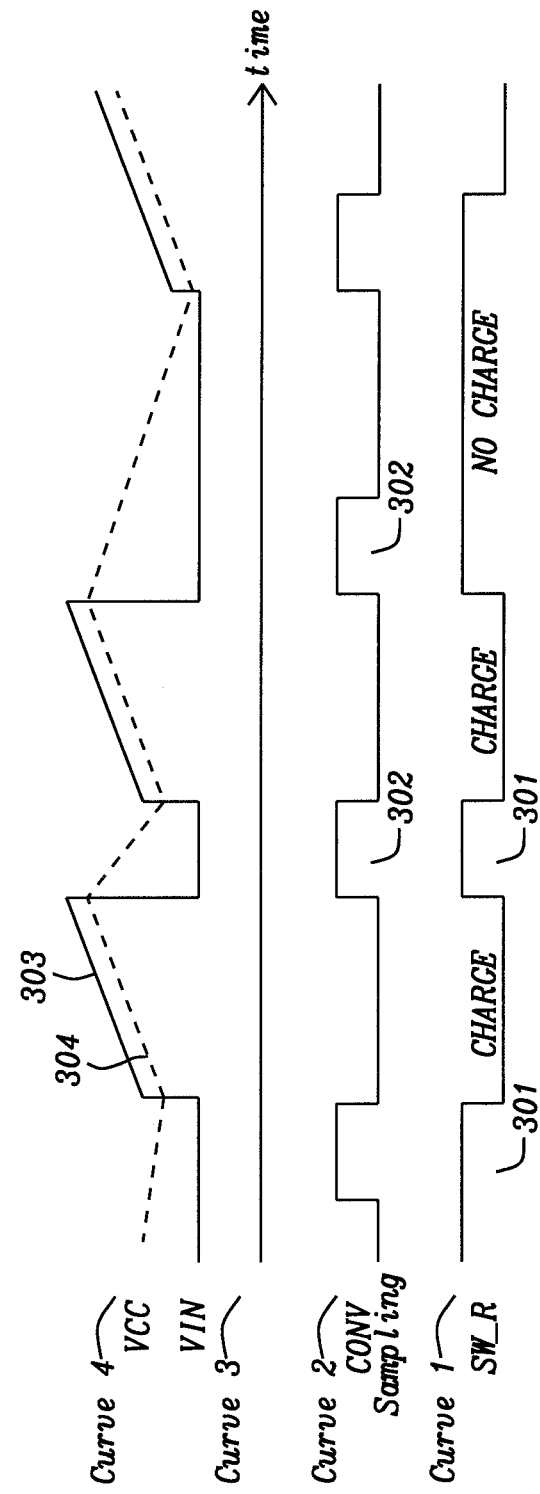
FIG. 3 schematically shows a comparison of the input voltage VIN and the output voltage VCC in dependence of a switch activation state signal. In addition, FIG. 3 also displays the interplay between the switch activation state and the probing of the mains voltage performed by an ADC converter.

In FIG. 3 the input voltage VIN over time (curve 3) is drawn schematically in comparison to the time dependence of the voltage at the VCC port 207 (curve 4) of the controller 100. The behavior of curve 3 and 4 is depicted in relation to an activation pattern SW_R of switch 209 (curve 1) and a periodic sampling signal CONV of the mains voltage performed by ADC 205 (curve 2). In other words, FIG. 3 shows the dependence and time response of the voltages VIN and VCC in relation to exemplary activation states of the switch 209 and mains voltage measurements of the ADC 205 as displayed in FIG. 2. The curve characteristics are discussed in detail in correspondence to the circuit displayed in FIG. 2.

As elaborated in connection with FIG. 2, in order to determine the mains voltage, switch 209 is controlled to be connected with internal resistor 204 for a certain time period. In such a closed state of switch 209, current from the rectifier 201 flows to ground via the internal resistor 204. During this duration, the mains voltage can be measured by ADC 205 as indicated by signal pulses 302 in CONV curve 2. Pulses 301 in SW_R curve 1 of FIG. 3 represent a closed state of switch 209.

Consequently, in a closed state of switch 209 (pulses 301 (signal high) of curve 1), the capacitor 208 is being discharged by powering the controller. This is reflected in the behavior of curve 4 in FIG. 3, wherein the voltage level VCC is decreasing within the same time duration of activation of switch 209, i.e. closing of switch 209. Simultaneously, the voltage VIN at input port 203 is at a constant level as indicated by curve 3. At the same time, the ADC 205 is enabled to perform measurements of the mains voltage $V_{MAINS}$. Measurement durations of the mains voltage measurements by the ADC 205 are represented by CONV pulses 302 in curve 2.

An opening of the switch 209 (represented by the low signal in curve 1) causes the capacitor 208 to be charged via current flowing through the VIN-VCC charging path. Consequently, there is no voltage drop across internal resistor 204 and thus, voltage measurement by the ADC 205 is not enabled as indicated by the low signal in curve 2.

On the other hand, after opening the switch 209, current from the rectifier 201 charges the capacitor 208 and causes an increase of the capacitor voltage as indicated by the increasing voltage VCC 304 in curve 4. At the same time, the voltage at input port 203 increases in correspondence to the voltage of the capacitor 208 as indicated by voltage VIN 303 in curve 3. Therefore, for a $V_{MAINS}$ measurement, the switch 208 is controlled to be closed in order to enable voltage probing by ADC 205. Controlling of switch 208 to be in a closed state also stops the charging process of capacitor 208. In other words, an activated (closed) switch 209 effectively controls the charging duration of capacitor 208 and consequently the magnitude of the VCC voltage. Thus, the embodiment according to FIG. 2 enables measurement of the mains voltage only in close correspondence to the charging-discharging cycle of capacitor 208.

Consequently, the above mentioned configuration does not enable measuring the mains voltage at any arbitrary time but relies on an activated switch 209. This is also indicated by the comparison of curve 1 and curve 2 of FIG. 3, where a $V_{MAINS}$ voltage measuring event (pulses 302) is only indicated for time durations, where the capacitor 208 is not charged, i.e. when the switch 209 is in the closed state (pulses 301).

However, such an interplay between switch activation and mains voltage measurement enables a simple control regarding instant and/or duration of mains voltage measurements via a control signal that governs the state of switch 209.

Therefore, the circuit configuration of the present embodiment provides the ability to sample input mains voltage based on a pulse width modulation basis of the input signal to allow charging of the VCC supply during the remaining time.

Figure 4:
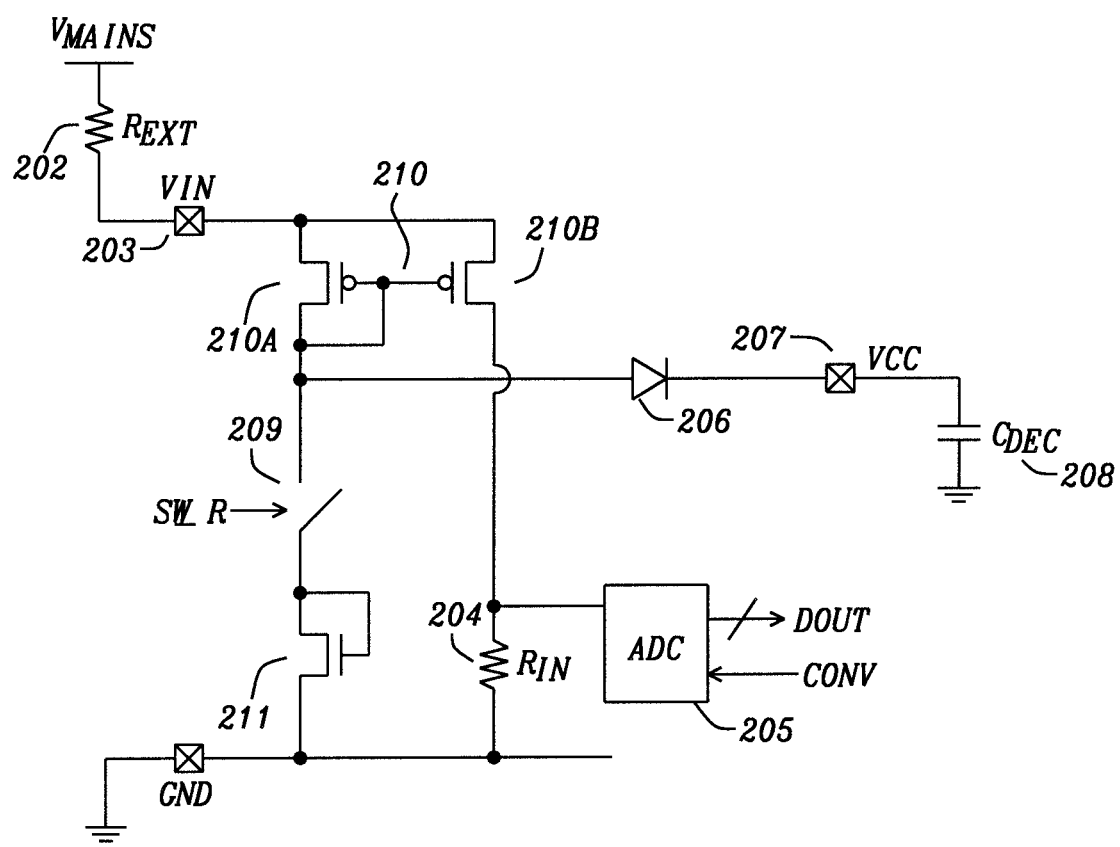
FIG. 4 schematically displays a further embodiment of the present invention. In particular, in order to enable both charging of the VCC supply and simultaneous measurement of the mains voltage, a current mirror is utilized.

In order to permit both charging of the VCC supply, i.e. capacitor 208, and simultaneous measurement of the mains voltage, the embodiment of the present invention depicted in FIG. 4 utilizes a current mirror. More precisely, FIG. 4 illustrates a circuit comprising a current mirror that enables $V_{MAINS}$ voltage measurements as well as charging of a VCC power supply in order to drive the controller 100 independently of each other. The circuit illustrated in FIG. 4 can be integrated into controller 100 and therefore represents an alternative way of operating controller 100 for supplying its own operating power and mains voltage value measurement.

As discussed in relation to the previous embodiment of the present invention, a rectifier (not displayed in FIG. 4) provides a voltage $V_{MAINS}$. An external resistor 202 is arranged between the rectifier and input port 203 of the controller 100. Deviating from the previous embodiment, a current mirror 210 is provided. The current mirror 210 enables the derivation of a current from another reference current. In other words, the current mirror 210 allows to "copy" and "scale" currents. Therefore, the current mirror 210 represents a current driven current source.

More specifically, in the depicted embodiment of FIG. 4, the current mirror 210 is connected with the input port 203 and receives a current from the input port 203. The current mirror 210 comprises a first branch 210 A and a second branch 210B. The current mirror 210 can be configured such that the second branch 210B carries only a smaller portion of the received current. Therefore, the current mirror 210 enables splitting of the current according to a current mirror ratio determined by specifications of the first branch 210 A and second branch 210B, in particular the dimensions (geometry) of the transistors in the first branch 210 A or the second branch 210B.

As further shown in FIG. 4, diode 206 and switch 209 are connected to a node in the first branch 210 A of the current mirror 210. The input voltage measuring unit, i.e. ADC 205, is connected to a node in the second branch 210B of the current mirror 210. More specifically, two current paths extend from the node in the first branch 210 A. The first current path comprises diode 206 and VCC-port 207 which is connected to power supplying capacitor 208 and consequently establishes a VIN-VCC charging path for the capacitor 208.

The second current path extending from the first branch 210 A of the current mirror 210 comprises switch 209 and a voltage setting unit 211, which is connected to ground. The voltage setting unit 211 in FIG. 4 is depicted as a diode-connected transistor. However, a Zener diode (possibly variable or controllable Zener diode) or a resistor can be also utilized in order to cause a voltage at the node of the first branch 210 A to be lower than the supply voltage. This causes interruption of a charge current into capacitor 208 and prevents overcharging of the capacitor 208. In addition, unit 211 may limit the current flow through the second current path when the switch 209 is closed. A second Zener diode may be connected between the VIN-VCC charging path and ground (i.e. connected between the diode 206 and the VCC port 207; not shown) to limit the supply voltage VCC to a maximum value.

When the switch 209 is in an open state a current flows via the VIN-VCC charging path to capacitor 208 and charges the capacitor 208. In addition, a scaled down version of the input current flows through current mirror branch 210B and via internal resistor 204 to ground, which enables the ADC 205 to perform mains voltage measurements.

Therefore, it is possible to perform measurements of the mains voltage although switch 209 is not activated, i.e. open, and a charging current is charging capacitor 208. In addition, in order to stop the charging process of the capacitor 208, switch 209 can be controlled to be activated, i.e. closed, at will. Such an activation of switch 209 causes an immediate interruption of the charging current of the capacitor 208. Therefore, activating switch 209 can be performed without interfering with the capability of the ADC 205 to perform measurements of the $V_{MAINS}$ voltage.

Thus, applications wherein reliance on both the mains voltage to generate the supply voltage of the controller 100 as well as having a requirement to know the mains voltage waveform can benefit from the embodiment according to FIG. 4 of the present invention. More specifically, the above described embodiment of the present invention assures power supply to the controller 100 and allows simultaneously to measure the mains voltage waveform at will. In other words, measuring of the mains voltage can be performed independently of the charging process of capacitor 208.

It should be noted that the description and drawings merely illustrate the principles of the proposed devices and methods. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and devices and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A controller for controlling a power converter to convert electrical power at an input voltage into electrical power at an output voltage, the controller comprising an input port configured to receive a voltage representative of the input voltage;

an input voltage measuring unit configured to sample a measuring voltage and determine a measurement value that is representative of the input voltage;

a switch;

a diode connectable with a storage unit to provide a supply voltage for the controller during operation of the controller, and a resistor which forms a voltage divider with an external resistor connected to the input port, the input voltage measuring unit connected with a terminal of the resistor to measure a portion of the input voltage, the portion determined by the voltage divider ratio;

wherein the switch is controlled to control charging of the storage unit from the voltage at the input port.

2. The controller of claim 1, wherein the power converter comprises a rectifier connectable with an alternating current (AC) mains supply, the input voltage being the rectified mains voltage provided by the rectifier.

3. The controller of claim 1, wherein the switch is controlled based on the supply voltage as provided by the storage unit.

4. The controller of claim 1, wherein the switch is closed when the supply voltage provided by the storage unit reaches a predetermined voltage threshold.

5. The controller of claim 1, wherein the power converter is a switched power converter comprising at least one power switch and the controller provides drive signals for the at least one power switch so as to regulate the output voltage of the power converter.

6. A controller for controlling a power converter to convert electrical power at an input voltage into electrical power at an output voltage, the controller comprising an input port configured to receive a voltage representative of the input voltage;

an input voltage measuring unit configured to sample a measuring voltage and determine a measurement value that is representative of the input voltage;

a switch; and a diode connectable with a storage unit to provide a supply voltage for the controller during operation of the controller, wherein the switch is controlled to control charging of the storage unit from the voltage at the input port, and wherein the input voltage measuring unit periodically samples the measuring voltage to periodically determine a measurement value for the input voltage.

7. The controller of claim 6, wherein the switch is closed during a sampling time of the input voltage measuring unit.

8. The controller of claim 6, wherein the power converter comprises a rectifier connectable with an alternating current (AC) mains supply, the input voltage being the rectified mains voltage provided by the rectifier.

9. The controller of claim 6, wherein the switch is controlled based on the supply voltage as provided by the storage unit.

10. The controller of claim 6, wherein the switch is closed when the supply voltage provided by the storage unit reaches a predetermined voltage threshold.

11. A controller for controlling a power converter to convert electrical power at an input voltage into electrical power at an output voltage, the controller comprising an input port configured to receive a voltage representative of the input voltage;

an input voltage measuring unit configured to sample a measuring voltage and determine a measurement value that is representative of the input voltage;

a switch; and a diode connectable with a storage unit to provide a supply voltage for the controller during operation of the controller, wherein the switch is controlled to control charging of the storage unit from the voltage at the input port, and wherein the input port is connected with the diode and a first terminal of the switch, the input voltage measuring unit sampling the measuring voltage at a second terminal of the switch.

12. The controller of claim 11, wherein the switch is controlled based on the supply voltage as provided by the storage unit.

13. The controller of claim 11, wherein the switch is closed when the supply voltage provided by the storage unit reaches a predetermined voltage threshold.

14. A controller for controlling a power converter to convert electrical power at an input voltage into electrical power at an output voltage, the controller comprising an input port configured to receive a voltage representative of the input voltage;

an input voltage measuring unit configured to sample a measuring voltage and determine a measurement value that is representative of the input voltage;

a switch;

a diode connectable with a storage unit to provide a supply voltage for the controller during operation of the controller, and a current mirror connected with the input port, receiving a current from the input port and splitting the current according to the current mirror ratio1 wherein the switch is controlled to control charging of the storage unit from the voltage at the input port.

15. The controller of claim 14, wherein the diode and the switch are connected to a node in a first branch of the current mirror and the input voltage measuring unit is connected to a node in a second branch of the current mirror.

16. The controller of claim 15, wherein the current mirror is configured such that the second branch carries only a smaller portion of the received current.

17. The controller of claim 14, wherein the first branch of the current mirror comprises a diode connected transistor, a Zener diode or a resistor.

* * * * *